United States Patent [19]

Levy et al.

[11] Patent Number: 4,702,438
[45] Date of Patent: Oct. 27, 1987

[54] ADAPTIVE LANDING GEAR

[75] Inventors: Robert S. Levy, Huntington; Thomas W. Kerr, Dix Hills, both of N.Y.

[73] Assignee: The United States of America as represented by the Secretary of the Air Force, Washington, D.C.

[21] Appl. No.: 755,394

[22] Filed: Jul. 16, 1985

[51] Int. Cl.⁴ .............................................. B64C 25/60
[52] U.S. Cl. .......................... 244/104 FP; 244/102 SS; 188/297; 188/299
[58] Field of Search ....... 244/104 FP, 100 R, 102 SS; 188/266, 275, 279, 289, 297, 299; 267/64.12, 64.15

[56] References Cited

U.S. PATENT DOCUMENTS

| | | | |
|---|---|---|---|
| 2,451,171 | 10/1948 | Mullen | 267/64 |
| 2,735,674 | 2/1956 | Smith et al. | 267/64 |
| 3,598,207 | 8/1971 | Hartel | 188/289 |
| 3,696,894 | 10/1972 | Brady et al. | 188/275 |
| 3,724,832 | 4/1973 | Ceska | 267/64 R |
| 3,888,436 | 6/1975 | Sealey | 244/104 FP |
| 4,004,762 | 1/1977 | Jenkins | 244/104 FP |
| 4,061,295 | 12/1977 | Somm | 244/104 FP |
| 4,273,303 | 6/1981 | Somm | 244/104 FP |
| 4,291,850 | 9/1981 | Sharples | 244/102 SS |
| 4,373,707 | 2/1983 | Mölders | 267/64.12 |
| 4,381,857 | 5/1983 | Cook | 267/64.15 |

Primary Examiner—Joseph F. Peters, Jr.
Assistant Examiner—Rodney Corl
Attorney, Agent, or Firm—Jacob N. Erlich; Donald J. Singer

[57] ABSTRACT

A light-weight, gas chargeable, self-contained, shock absorber piston assembly which can be retrofitted to various landing gear. The invention permits taxi and take off in either a "normal" or "rough" runway configuration, followed by subsequent landing, taxi and take off again in either mode. The reconfiguration of the gear for these modes is at the option of the aircrew. There is no need to resupply the landing gear with gas from an external source until completion of a number of system actuations.

2 Claims, 8 Drawing Figures

ADAPTIVE LANDING GEAR

STATEMENT OF GOVERNMENT INTEREST

The invention described herein may be manufactured and used by or for the Government for governmental purposes without the payment of any royalty thereon.

The present invention relates to landing gear, and more particularly, to a self-contained adaptive landing gear system. An adaptive landing gear is defined as one which has spring rate and damping characteristics which can be modified by the action of an aircrew member to be more suitable for the roughness of the landing strip encountered or anticipated.

Adjustable shock absorbers, such as air suspension shock absorbers, have been used on automobiles for many years, wherein the front and rear shock absorbers of the vehicle can be selectively adjusted for greater or lesser stroke by means of user actuation of an air compressor. Ordinarily, such arrangement is variable at the option of the vehicle operator by means of a control actuator. However, when applying such concept to aircraft, certain new considerations are encountered. Hence, it is desirable to provide a light-weight adaptive shock-absorbing landing gear which requires a minimum of space, is self-contained, and can in fact be retrofitted to known landing gear configurations.

SUMMARY OF THE INVENTION

The present system comprises a light-weight, gas (such as nitrogen) chargeable, self-contained, shock absorber piston assembly which can be retrofitted to various landing gear. The invention permits taxi and take off in either a "normal" or "rough" runway configuration, followed by subsequent landing, taxi and take off again in either mode. The reconfiguration of the gear for these modes is at the option of the aircrew. There is no need to resupply the landing gear with gas from an external source until completion of a number of system actuations.

The embodiments illustrated in the accompanying drawings, by way of illustration and not limitation, were adapted to the main and nose landing gear of an A-10 aircraft. Such embodiments provide for storage of the necessary additional pressurized gas within the shock strut piston of the individual gear. This feature simplifies installation and increases efficiency and reliability over arrangements requiring an external gas chamber which must be coupled to the landing gear.

The present invention cooperates with the conventional weight-on-wheels ("squat") switch of the main strut and down-lock switch of the drag strut in the landing gear. Furthermore, a pilot selection switch is provided in the cockpit to facilitate air crew selection of either a normal configuration or a rough runway configuration of landing gear employing the invention.

BRIEF DESCRIPTION OF THE DRAWINGS

The invention will be more clearly understood by reference to the following detailed description of a preferred embodiment thereof in conjunction with the accompanying drawings, in which.

DETAILED DESCRIPTION OF A PREFERRED EMBODIMENT

Figure 1:
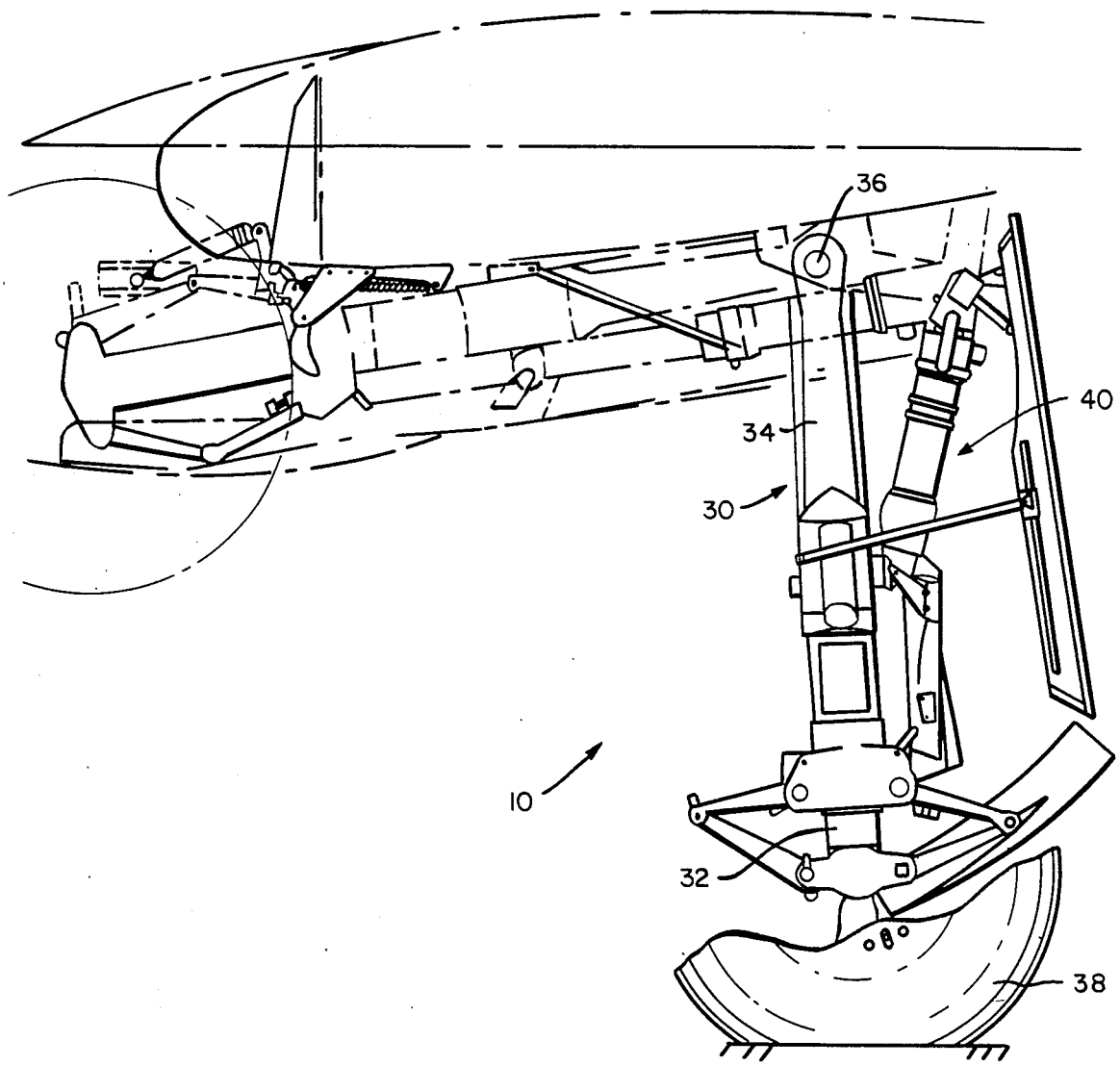
FIG. 1 is a side view of a prior art baseline landing gear.

The present invention is disposed for use in the landing gear of various aircraft. An exemplary A-10 main gear configuration is shown in FIG. 1 as an illustrative baseline structure to which the invention may be adapted. This main gear 10 comprises main shock absorbing strut 30, having a piston 32 disposed for stroking within cylinder 34 of strut 30. Strut 30 at its closed end is joined to the aircraft at trunion 36. Piston 32 is coupled to wheel 38 (not shown in detail). Main strut 30 is also coupled to the aircraft by means of drag strut 40. More particularly, drag strut 40 is coupled at one end thereof to the aircraft and is coupled at its distant end to the main strut 30 via the drag strut piston. The drag strut serves to raise and lower the landing gear as commanded by the air crew and also includes a locking device which locks the gear in a down position, such as a hydraulic interlock, and also includes a down-lock switch for detection of the locked down condition.

In practice of the present invention, strut 30 having a passive piston 32 is replaced with the active system of the present invention in a manner compatible with the configuration of the existing landing gear. The adaptive system of the present invention is shown schematically in FIG. 2, comprising piston 12 cooperatively housed within cylinder 35 of strut 11. Piston 12, it will be seen, acts as a carrier for certain other components of the invention. Hence, within piston 12, a first chamber 23 (indicated by broken lines for clarity of description only) is defined in piston 12 for receipt of a floating piston 16. The floating piston 16 redefines chamber 23 into upper and lower chambers 21 and 18, respectively.

In application of the invention, a desired amount of hydraulic fluid 14 is loaded in the upper chamber 21, while chamber 18 is charged with gas (preferrably nitrogen), as described below. Hence, it will be appreciated that as the volume of gas in chamber 18 varies, a representative transmission of such variance is carried by the hydraulic fluid 14 to displace piston 12 out of cylinder 35 accordingly.

An auxiliary gas chamber 20 is independently defined in the bottom section of piston 12. This chamber 20 is charged with an amount of compressed gas and is selectively discharged in a manner described below. Also incorporated within strut 11 are timer 33, charging valve 27, three-way two-position valve 22, shut-off valve 24, and pressure reducing valve 26. The three-way two-position valve 22 couples the primary chamber 18 either to shut-off valve 24 or to auxiliary chamber 20. Shut-off valve 24 in turn is coupled to the atmosphere via pressure reducing valve 26 and a vent 25. Charging valve 27 enables recharging of auxiliary chamber 20 by the ground crew when valve 22 is in the position shown in FIG. 2.

Figure 2:
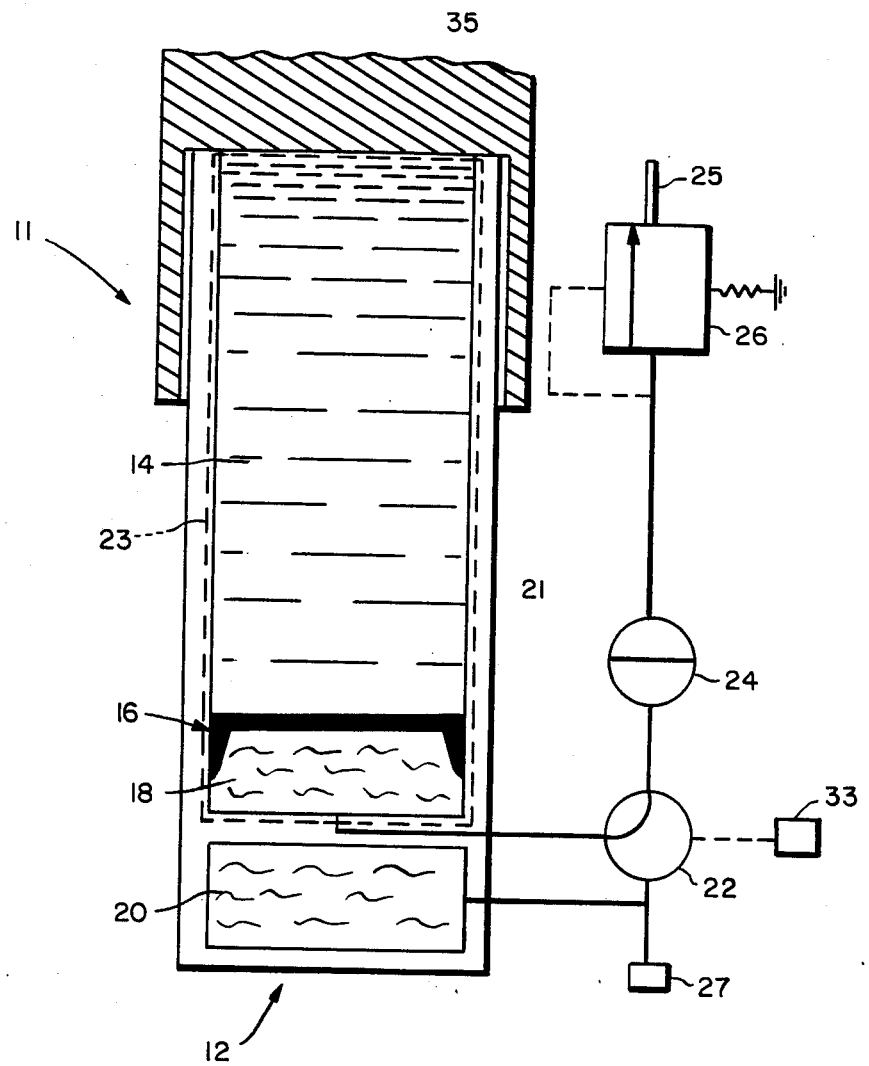
FIG. 2 is a schematic of the invention in passive mode, with strut static, squat switch open, downlock switch closed, and gear handle down.

FIG. 2 is a schematic of the invention in passive mode, with strut static, squat switch open, downlock switch closed, and gear handle down. In this mode, the primary chamber 18 is isolated from auxiliary chamber 20. This isolation is achieved by means of maintaining valve 22 in the operative condition seen in FIG. 2, so that gas will not flow out of chamber 20.

To achieve rough runway shock absorbing action, the stored high pressure gas of chamber 20 is directed into primary chamber 18 to raise the pressure thereat by means of appropriate positioning of valve 22. This pressure increase is then translated via floating piston 16 and fluid 14 to partial extension of piston 12 out of strut cylinder 35. This extension facilitates additional travel of the piston before "bottoming" will occur, thus providing extra shock absorbing action to the gear. Hence, the slope of the load-deflection curve will be favorably decreased.

The gas in a charged primary chamber 18 may be vented to the atmosphere when the strut is unloaded and extended to return the strut to normal runway configuration. Furthermore, by means of appropriate configuration of valve 22, the auxiliary chamber 20 is isolated when the primary chamber is vented, such that auxiliary chamber 20 retains its remaining charge. Hence, the primary chamber 18 may again be charged from chamber 20 for a subsequent rough runway taxi, take-off or landing. Thus, it will be appreciated that the active life of the system, per charge of chamber 20, is dependent upon the storage capacity of chamber 20 and the number of rough runway actuations which transpire.

The 3-way valve position is controlled by the position of the squat switch. When the weight of the aircraft is on the wheels, the squat switch is "open"; when the weight is off of the wheels, the squat switch is "closed". Whenever the squat switch is open, the primary and auxiliary strut chambers are interconnected unless this function is overridden by positioning of the mode selection switch to the passive mode.

To illustrate the operation of the system, a scenario will be followed in which the aircraft starts a mission by taxiing in the rough runway mode with a fully charged auxiliary chamber 20, and then goes through the following sequence: lift-off; gear retraction; selection of rough runway mode; gear extension; landing; taxi after touchdown; and conversion to rough runway configuration during taxi.

Figure 3:
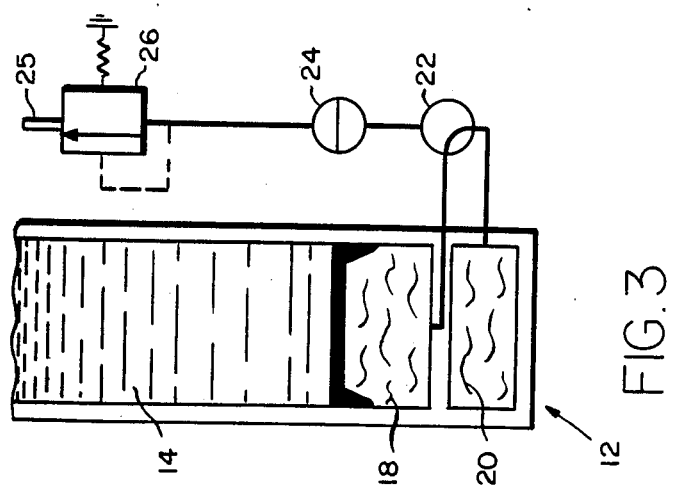
FIG. 3 is a schematic of the invention in rough runway mode, with strut static, squat switch open, downlock switch closed, and gear handle down.

FIG. 3 is a schematic of the invention in the rough runway mode, with strut static, squat switch open, downlock switch closed, and gear handle down. Air crew selection of the rough runway mode has caused the three-way valve to go to the position shown causing the auxiliary nitrogen chamber to be connected to the primary nitrogen chamber. Since the auxiliary chamber was initially charged to a pressure higher than the primary chamber, the equalization of pressures has caused the aircraft to rise to a new static position, higher than normal, thereby allowing more stroke, in order to better absorb the runway roughness. The increase in effective gas volume due to the addition of the auxiliary chamber to the primary chamber also has reduced the stiffness of the gas spring, which reduces the force introduced into the aircraft when traversing rough terrain.

Figure 4:
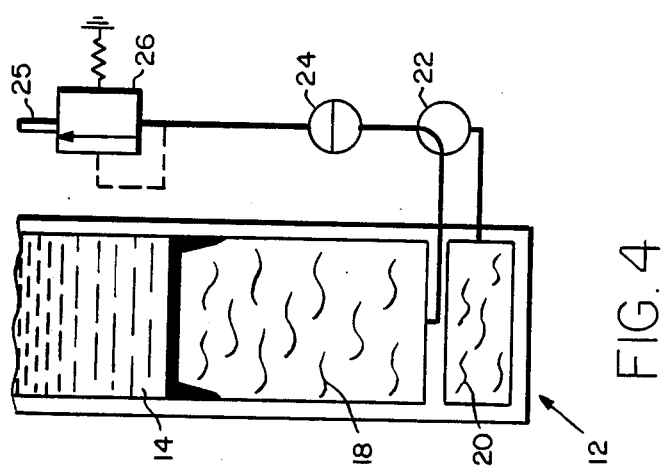
FIG. 4 is a schematic of the invention in rough runway mode, with strut extended, squat switch closed, downlock switch closed, and gear handle down.

At liftoff, as the weight is gradually removed from the wheels, the gear strut piston 12 extends, automatically reducing the pressure in both chambers. As the piston achieves a fully extended condition, the squat switch closes causing positioning valve 22 to isolate the primary and auxiliary chambers from each other. This is indicated in FIG. 4, which is a schematic of the invention in rough runway mode, with strut extended, squat switch closed, downlock switch closed, and gear handle down. (Note that with valve 24 still in its shut-off condition, the charge in primary chamber 18 will be retained therein and will not be released to the atmosphere at this time.)

Figure 5:
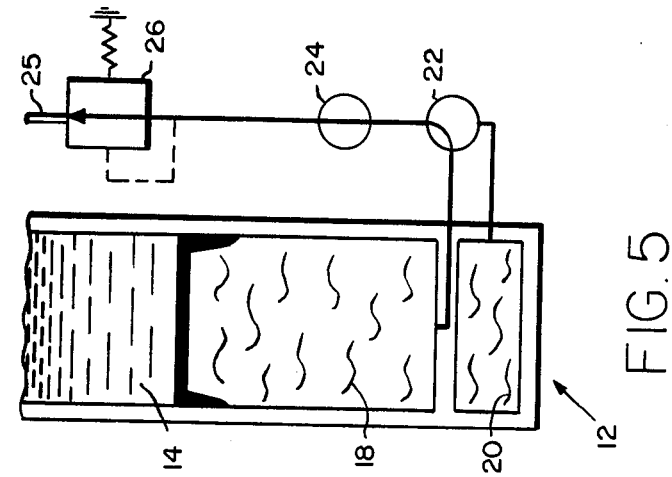
FIG. 5 is a schematic of the invention in rough runway mode, with strut extended, squat switch closed, downlock switch open, and gear handle up.

When the landing gear handle is positioned to the "gear up" position, the downlock switch in each drag strut opens as the gear retracts. This action is coordinated with positioning of the shut-off valve 24 so as to exhaust the gas from the primary chamber to the atmosphere via pressure reducing valve 26. This exhausting then reduces the pressure in the primary chamber to the normal charging pressure for a fully extended gear. (Valve 26 closes when it detects this normal charging pressure, thus preventing further discharge of chamber 18). The gear then continues to retract to the up and locked position. This is represented by FIG. 5, which is a schematic of the invention in rough runway mode, with strut extended, squat switch closed, downlock switch open, and gear handle up. In a preferred embodiment, the pilot's mode select switch now automatically returns to the passive mode. This may be achieved, for example, by deenergization of a self-holding type mode select switch upon detection of the "gear up" condition.

Prior to landing, the pilot has the option of selecting either a passive or adaptive strut configuration by positioning the mode selection switch to the desired normal or rough runway mode. This election may also be made after touchdown. In a preferred embodiment, the failure to select a mode will result in the system remaining in the passive mode (default).

Figure 6:
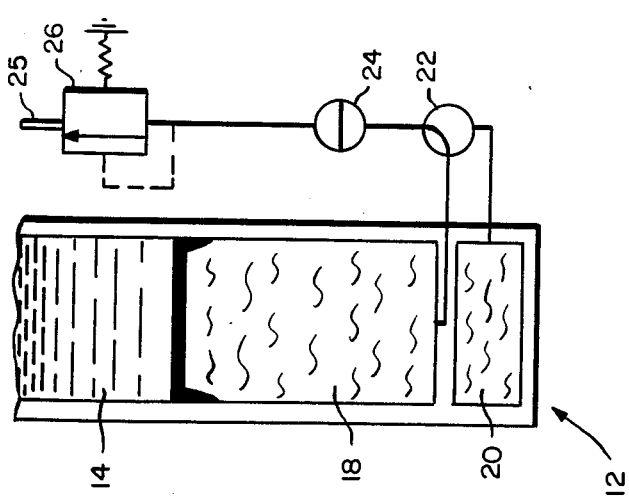
FIG. 6 is a schematic of the invention in rough runway mode, with strut extended, squat switch closed, downlock switch closed, and gear handle down.

Assuming the adaptive mode is selected and the gear handle is placed in the down position, the gear extends and as the downlock switch closes, the shut-off valve is ported to the closed position thereby trapping the normal charging pressure of nitrogen in the primary chamber and preparing the strut for a normal passive strut landing. This initial landing configuration is indicated in FIG. 6, which is a schematic of the invention in rough runway mode, with strut extended, squat switch closed, downlock switch closed, and gear handle down.

Figure 7:
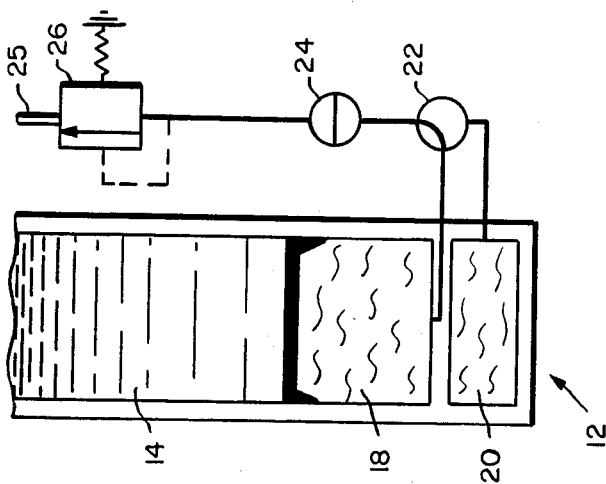
FIG. 7 is a schematic of the invention in rough runway mode, with strut stroking, squat switch open, downlock switch closed, and gear handle down.

At touchdown, the squat switch opens and initiates operation of timer 33, which maintains the passive condition for an empirically established time period which lasts at least until the wheel spin up and rebound loads are terminated and the strut is essentially stabilized. This passive condition is indicated in FIG. 7, which is a schematic of the invention in rough runway mode, with strut stroking, squat switch open, downlock switch closed, and gear handle down.

Figure 8:
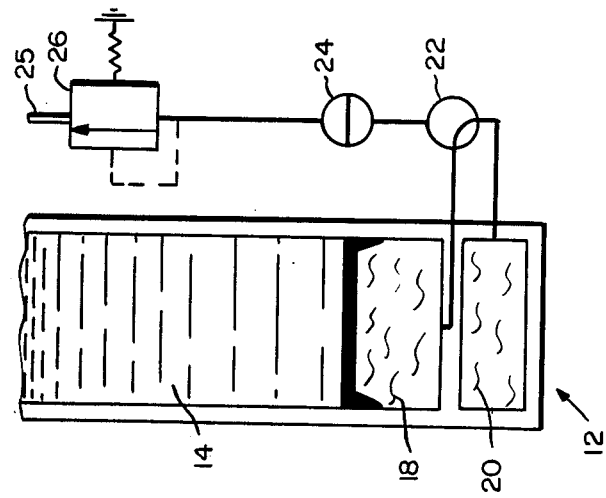
FIG. 8 is a schematic of the invention in rough runway mode, with strut static, squat switch open, downlock switch closed, and gear handle down.

When timer 33 has run its preset interval, the three-way valve 22 is energized and driven into the open condition providing delivery of nitrogen to the primary chamber from the auxiliary chamber, thereby providing a soft (rough runway) air spring for taxi, as indicated in FIG. 8. FIG. 8 is a schematic of the invention in rough runway mode, with strut static, squat switch open, downlock switch closed, and gear handle down. If passive mode had been selected prior to landing, however, the struts would have remained in the passive mode of FIG. 6.

While the present invention has been described in connection with rather specific embodiments thereof, it will be understood that many modifications and variations will be readily apparent to those of ordinary skill in the art and that this application is intended to cover any adaptation or variation thereof. Therefore, it is manifestly intended that this invention be only limited by the claims and the equivalents thereof.

What is claimed is:

1. In a landing gear for aircraft, said landing gear having a main shock absorbing strut and a wheel, the improvement therein being in the form of an adaptive landing gear assembly operably connected between said main shock absorbing strut and said wheel, said adaptive landing gear assembly comprising:
    a housing, said housing having a first chamber and a second chamber therein;
    a floating piston located within said first chamber, said floating piston defining together with said housing a lower chamber within said first chamber below said floating piston;
    means for selectively coupling said lower chamber to said second chamber and to the atmosphere for selectively maintaining pressure within said lower chamber, said selective coupling means including a three-way, two position valve, a pressuring reducing valve, a vent and a shut-off valve interposed between said two-position valve and said pressure reducing valve; and
    means for introducing a regulated amount of gas either into said second chamber for subsequent introduction into said lower chamber of said first chamber via said two positions valve or into the atmosphere via said two position valve, said shutoff valve, said pressure reducing valve and said vent in order to regulate the position of said wheel relative to said main shock absorbing strut.

2. In a landing a gear for an aircraft as defined in claim 1, further comprising a timer connected to said two-position valve, wherein said coupling means is controlled by said timer.

* * * * *